United States Patent Office 2,842,588
Patented July 8, 1958

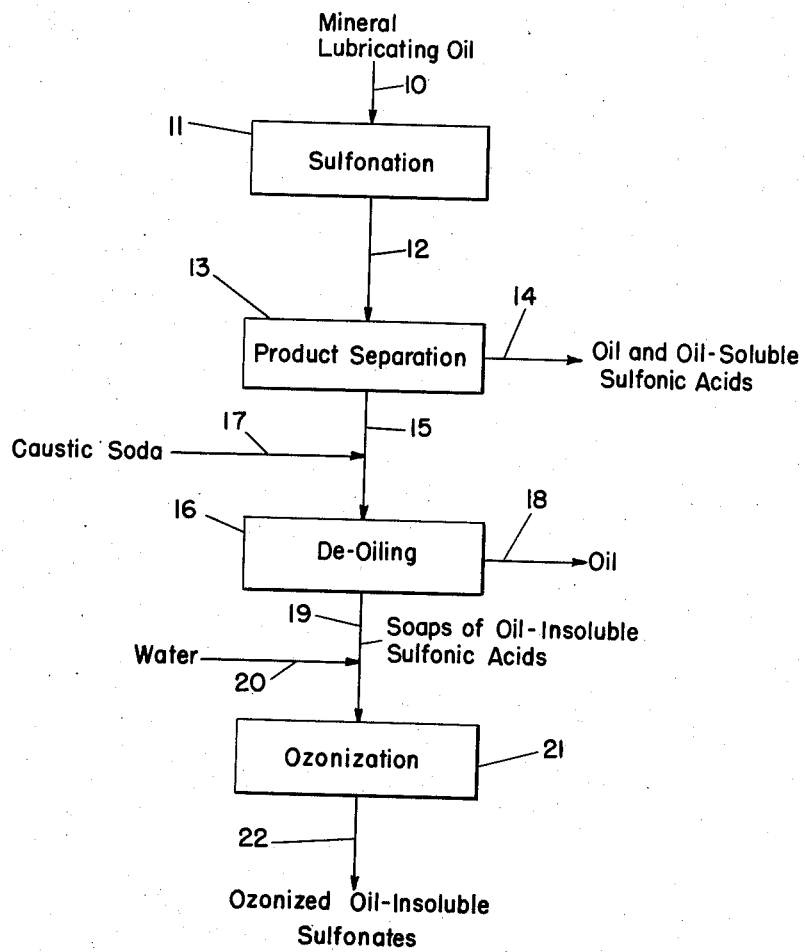

2,842,588

TREATMENT OF SULFONIC ACIDS

Earl M. Honeycutt, West Chester, Pa., assignor to Sun Oil Company, Philadelphia, Pa., a corporation of New Jersey Application July 3, 1957, Serial No. 674,001

11 Claims. (Cl. 260—504)

This invention relates to the treatment of petroleum sulfonic acids to improve the properties thereof, and to the product thereby obtained.

In the sulfonation of petroleum, oil-soluble or "mahogany" sulfonic acids and oil-insoluble or "green" sulfonic acids are produced. The sulfonated petroleum containing mahogany acids is separated from the "sludge" containing green acids. Mahogany acids are recoverable from unsulfonated hydrocarbons by neutralizing the sulfonated petroleum, for example with alkali metal hydroxide, and contacting with aqueous alcohol such as isopropanol and an aliphatic hydrocarbon solvent such as pentane or petroleum naphtha to obtain an alcohol solution of the sulfonates and a naphtha solution of the hydrocarbons. The sulfonates can be obtained as a concentrate containing residual hydrocarbons, or, by further extraction of an aqueous alcohol solution with naphtha, as substantially completely de-oiled sulfonates.

Petroleum sulfonic acids have considerable potential usefulness in various fields, for example as surface active agents. However, as originally recovered from sulfonation products, these acids frequently have unsatisfactory color and insufficient surface activity for the desired uses. The present invention provides a highly advantageous manner of improving the properties of petroleum sulfonic acids, and particularly the color and wetting properties of such acids. These beneficial results are obtained by contacting petroleum sulfonate stock with ozone under partial oxidation conditions, the contacting being continued until carboxyl acidity equivalent to at least 0.05 cc. of 1 N NaOH per 100 ml. of a 0.5 weight percent solution of the sodium salts of the sulfonic acids has been produced.

Any suitable ozone-containing gas can be employed according to the invention. Ozonized air is a preferred ozone-containing gas, but any other such gas can be used. The gas preferably contains at least 0.1 weight percent of ozone. Generally, the amount of ozone in the gas will not exceed 10 weight percent, though larger amounts can be used.

The temperature of the treatment is preferably within the approximate range from 100° F. to 200° F. Preferred temperatures for use where the petroleum sulfonate stock comprises unneutralized sulfonic acids are those within the approximate range from 100° F. to 150° F., higher temperatures being preferably avoided in order to avoid excessive decomposition of sulfonic acids during the treatment. Preferred temperatures where the petroleum sulfonate stock comprises neutralized sulfonic acids, e. g. alkali metal or alkaline earth metal salts are those within the approximate range from 160° F. to 190° F. Generally, higher temperatures result in more rapid oxidation and are advantageous if not so high as to produce excessive decomposition.

The treatment according to the invention can be performed on aqueous or hydrocarbon solutions of the petroleum sulfonate stock. The relative amounts of sulfonate stock and of water or hydrocarbon are such as to provide a suitably low viscosity in order to facilitate contact of the ozone with the sulfonate stock. Preferably, an aqueous solution of alkali metal salts of the sulfonic acids is employed, e. g. a 1 to 25 weight percent solution. Preferably, the charge stock for the ozone treatment is substantially free of unsulfonated hydrocarbons, since greater improvement in wetting properties as a result of the treatment is generally obtained in such case.

The treatment according to the invention is preferably conducted at atmospheric pressure or an elevated pressure not exceeding 100 p. s. i. g. Preferred rates of contact of ozone-containing gas with charge material are within the range from 0.01 to 0.5 cubic feet of gas per minute per 1000 ml. of charge.

The sulfonic acids treated according to the present invention may have been prepared in any suitable manner involving sulfonation of petroleum hydrocarbons including aromatic hydrocarbons, with a sulfonating agent, e. g. an hydrous $SO_3$, sulfuric acid, oleum, chlorsulfonic acid, etc., followed by separation of oil-insoluble sulfonic acids from unreacted oil and oil-soluble sulfonic acids. The latter separation is usually effected by allowing the oil-insoluble acids to settle out as a lower layer and decanting the upper oil layer containing oil-soluble sulfonic acids. Suitable charge stocks for sulfonation include lubricating oils having S. U. viscosity for example within the range from 80 seconds at 100° F. to 300 seconds at 210° F. Highly suitable sulfonating agents are mixtures of gaseous anhydrous $SO_3$ and a carrier gas such as air, nitrogen, flue gas, etc. The sulfonation or product separation or both may be conducted in the presence of a suitable inert diluent, e. g. petroleum naphtha.

The invention will be further described with reference to the attached drawing which schematically illustrates one embodiment of the invention.

In the process illustrated, mineral lubricating oil is introduced through line 10 into sulfonation zone 11 wherein it is contacted under sulfonating conditions with a sulfonating agent introduced through means not shown. The sulfonation products are introduced through line 12 into product separation zone 13. Unsulfonated lubricating oil containing oil-soluble sulfonic acids in solution is separated, e. g. by stratification and decantation, from oil-insoluble sulfonic acids, and is removed through line 14.

Oil-insoluble acids are removed from zone 13 through line 15 and introduced into de-oiling zone 16 after saponification with caustic soda introduced through line 17. In zone 16, the soaps of the oil-insoluble acids are de-oiled by contact with a solvent for oil, e. g. petroleum naphtha, introduced through means not shown. A solution of oil in solvent is withdrawn through line 18, and de-oiled soaps, e. g. nearly completely oil-free soaps, are removed through line 19 and introduced, after dilution with water introduced through line 20 to reduce viscosity, into ozonization zone 21, wherein they are contacted under partial oxidation conditions with an ozone-containing gas introduced thereinto through means not shown.

The product of the invention is removed from ozonization zone 21 through line 22. This product has much improved properties over the material charged to treatment, as shown more fully in the following examples, which illustrate the invention.

Example I

Oil-insoluble, "green" sulfonic acids were de-oiled and de-salted almost completely and then treated with ozonized air to obtin a product having much improved color and wetting properties over those of the green acids both before and after de-oiling and de-salting.

The charge material had been prepared by sulfonation of a furfural-refined lubricating oil containing about 27 percent aromatics and having S. U. viscosity at 100° F. of about 600 with a mixture of a minor proportion of gaseous anhydrous $SO_3$ and a major proportion of air, followed by separation of the oil-insoluble green acids from the oil layer of the product, which layer contained the mahogany acid products in solution. After saponification with a slight excess of caustic soda, the green acid soaps were found to have the following composition:

| Component: | Weight percent |
| --- | --- |
| Sodium sulfonate | 27.8 |
| Sodium carboxylate | 0.2 |
| Sodium hydroxide | 0.3 |
| Inorganic salts | 10.2 |
| Water | 47 |
| Oil | 14.2 |
| | 99.7 |

The charge material was de-oiled by extraction with naphtha and de-salted in a conventional manner to obtain an ozonization charge material having the following composition:

| Component: | Weight percent |
| --- | --- |
| Sodium sulfonate | 90.3 |
| Sodium carboxylate | 2.06 |
| Inorganic salts | 0.66 |
| Water or volatile material | 2.4 |
| Oil | 0.79 |
| | 96.21 |

This ozonization charge material had NPA color of 5, and wetting and rewetting times (determined as subsequently described) of 290 seconds and 60 seconds respectively. The original charge material had NPA color of 8 plus (i. e. black), and wetting and rewetting times of 400 seconds and 135 seconds respectively. Thus, it is seen that the de-oiling and de-salting improved the color and wetting and rewetting properties of the green acid soaps.

The de-oiled and de-salted ozonization charge material was diluted with water until the water concentration was 85 percent and then treated with ozonized air obtained from a Welsbach generator and containing 1 to 2 percent ozone, the temperature of the ozonization being about 175° F., the pressure of the ozonization being about 8 p. s. i. g., and the average ozonized air rate being about 0.1 cubic feet per minute. The volume of the ozonization charge was about 1000 ml. As the ozonization progressed, samples were taken from the liquid products, and the samples were tested for color, wetting properties, rewetting properties, and acidity.

The wetting properties were determined by diluting the sample with water until the calculated weight percent of sodium sulfonate in the solution was 0.5, then placing a standard circular piece of cotton duck having 1-inch diameter on the surface of the solution in a beaker, and determining at 77° F. the length of time which elapsed before the piece of cloth sank.

The rewetting properties were determined by taking the piece of cloth from the sulfonate solution, drying it in an oven overnight at a temperature of about 110° F., then placing the piece of cloth on the surface of water in a beaker, and determining at 77° F. the length of time which elapsed before the piece of cloth sank.

The acidity of the sample is an indication of the degree to which oxygen has reacted with the organic constituents of the ozonization charge to form carboxylic materials. The acidity of the sample was obtained diluting the sample with water until the calculated weight percent of sodium sulfonate in the solution was 0.5 and neutralizing the dilute solution with sodium hydroxide. The acidity is expressed in cc of 1 N NaOH per 100 ml. of the dilute solution, and can be converted to saponification number by stoichiometric calculation.

The amount of zone reacted with the sulfonate in each sample was calculated by difference between the amount generated, as measured by standard iodine titration methods, and the amount remaining in the ozonized air after contact with the charge material, similarly measured. In the following tables, the amounts reacted are expressed as weight percent of ozone contained in a 50 weight percent aqueous solution of the charge material; this requires calculating back from an 85 percent solution to a 50 percent solution.

The following table shows the effect of the ozonization on the color of the green acid soaps, as determined by the above tests:

| Perecent $O_3$ reacted: | NPA color |
| --- | --- |
| 0 | 5 |
| 1.7 | 4+ |
| 2.5 | 3½+ |
| 4 | 3 |
| 5 | 3— |
| 10 | 1½ |

This table shows that a highly advantageous color improvement is obtained by ozonization and that the degree of color improvement increases with the amount of ozone which reacts with the green acid soaps.

The following table shows the effect of the ozonization on the wetting time of the green acid soaps, as determined by the above tests:

| Percent $O_3$ reacted: | Wetting time in seconds |
| --- | --- |
| 0 | 290 |
| 0.5 | 175 |
| 1 | 100 |
| 2 | 85 |
| 5 | 70 |
| 10 | 50 |

This table shows that a highly advantageous improvement in wetting properties is obtained by ozonizing and that the degree of improvement increases with the amount of ozone which reacts with the green acid soaps.

The following table shows the effect of the ozonization on the rewetting time of the green acid soaps, as determined by the above tests:

| Percent $O_3$ reacted: | Rewetting time in seconds |
| --- | --- |
| 0 | 60 |
| 3 | 140 |
| 5 | 100 |
| 7 | 75 |
| 10 | 65 |

This table shows that ozonization of the nearly completely de-oiled green acid soaps has, up to 10 percent ozone reacted, a deleterious net effect on the rewetting properties, in spite of a decrease in rewetting time from 3 to 10 percent ozone reacted. In Example II, by way of contrast, it is shown that ozonization of only partially de-oiled green acid soaps, containing about 16 weight percent oil on a water-free basis, has a highly beneficial action on rewetting properties.

The following table shows the effect of the ozonization on the acidity of the charge material. Since the charge material is originally basic and was still basic after 0.8 percent ozone reacted, no acidity is recorded for 0 and 0.8 percent ozone.

| Percent O₃ Reacted | Acidity in cc. of 1 N NaOH per 100 ml. of 0.5% Soln. |
|---|---|
| 0 | |
| 0.8 | |
| 1.7 | 0.07 |
| 2.5 | 0.1 |
| 3.3 | 0.2 |
| 4.2 | 0.3 |
| 5.0 | 0.4 |
| 5.8 | 0.6 |
| 6.7 | 0.7 |
| 7.5 | 0.9 |
| 8.3 | 1.1 |
| 10.0 | 1.5 |
| 11.7 | 1.9 |
| 13.3 | 2.7 |

Thus, it is seen that the products obtained according to the invention are oxidized, oil-insoluble sulfonic acids having carboxyl acidity equivalent to, say, at least 0.05 cc. of 1 N NaOH per 100 ml. of 0.5% solution, and have beneficial properties not possessed by corresponding sulfonic acids not having such carboxyl acidity. The products of the invention may advantageously have carboxyl acidity as high as 3.0 or greater, measured as cc. of 1 N NaOH per 100 ml. of 0.5% solution.

*Example II*

The original charge material described in Example I containing 14.2 percent oil (26.8 percent on a water-free basis) was partially de-oiled until it contained about 16 weight percent oil on a water-free basis. The ozonization charge material thus obtained had NPA color of 8 plus (black), wetting time of 350 seconds, and rewetting time of 114 seconds.

This ozonization charge material was diluted with water to a water concentration of 72 percent and 1000 ml. of the charge were then ozonized by the same procedure as employed in Example I, except that the average ozonized air rate was 0.08 cubic feet per minute. The following tables show the effect of ozonization on color, wetting time, rewetting time, and acidity:

| Percent O₃ Reacted | NPA Color | Wetting Time | Rewetting Time | Acidity |
|---|---|---|---|---|
| 0 | Black 6 | 350 | 114 | |
| 1.0 | | | | 0.05 |
| 1.7 | | 380 | 70 | 0.1 |
| 2.3 | | 365 | | 0.2 |
| 2.8 | | 348 | | 0.2 |
| 3.5 | | 333 | 65 | 0.3 |
| 4.0 | 3½+ | 329 | | 0.4 |
| 4.5 | | | 87 | 0.4 |
| 5.1 | 3½+ | 341 | | 0.4 |
| 5.7 | | 265 | 67 | 0.5 |
| 6.3 | | | 49 | 0.6 |
| 7.4 | | 275 | 96 | 0.7 |
| 8.5 | 2½+ | 206 | 105 | 1.0 |
| 9.7 | | 283 | 176 | 1.1 |
| 10.8 | | 338 | | 1.4 |
| 11.4 | | 322 | 260 | |

With regard to color, this example shows that ozonization improves the color of the partially de-oiled sulfonates and that the degree of improvement increases with increasing amounts of ozone reacted.

With regard to wetting time, this example shows that, after an initial period in which there is no improvement, ozonization improves the wetting properties of the partially de-oiled sulfonates until about 8.5 percent ozone has reacted, and that upon further ozonization, the wetting properties deteriorate. Thus, for this particular example, there is an improvement in wetting properties in the range from 1.7 to 8.5 percent ozone reacted and a net improvement in wetting time throughout the range from 2.8 to 11.4 or more percent ozone reacted.

With regard to rewetting time, this example shows that ozonization improves the rewetting properties of the partially de-oiled sulfonates until about 6.3 percent ozone has reacted, and that upon further ozonization the rewetting properties deteriorate. A net improvement in rewetting properties is obtained throughout the range from 0 to 8.5 percent ozone reacted. This result is to be contrasted with that obtained in ozonizing completely de-oiled sulfonates, as shown in Example I, where no net improvement in rewetting properties occurred anywhere in the range from 0 to 10 percent ozone reacted.

From the above results, it is seen that a net improvement in both wetting and rewetting properties may be obtained with the partially de-oiled charge material of this example by reacting the charge with 2.8 to 8.5 percent ozone. Optimum percent ozone for wetting properties is 8.5 percent; optimum for rewetting properties is 6.3 percent.

By comparison of the effects of ozonization on wetting properties in Examples I and II respectively, it is seen that it is preferred from the standpoint of improvement in wetting properties, that the ozonization charge be nearly completely de-oiled, since a more rapid improvement in wetting properties is obtained with such charge than with a charge which is partially de-oiled to an oil content of 16 percent on the water-free basis. Also, a greater ultimate improvement can be obtained with the nearly completely de-oiled charge.

Thus, it is seen that complete de-oiling favors improvement in wetting properties. Preferably, if improvement in wetting properties is primarily desired, the oil content of the ozonization charge is less than 5 weight percent on the water-free basis. If improvement in rewetting properties is desired, satisfactory results can be also obtained when the oil content of the ozonization charge is in the range from 5 to 25 weight percent on the water-free basis.

*Example III*

Operation generally similar to that described in Example I is performed employing substantially oil-free mahogany sulfonates in aqueous solution in place of green sulfonates. The mahogany sulfonates are obtained by neutralizing with caustic soda the oil layer obtained upon separation of the green acids and separating the sodium sulfonates from the hydrocarbons by extraction with 35% aqueous isopropanol. Generally similar results with respect to color and wetting properties are obtained in the ozone treatment as compared with those obtained in Example I.

*Example IV*

Operation generally similar to that in Example II is performed employing, in place of green sulfonates, partially de-oiled sodium mahogany sulfonates containing about 36 weight percent of unsulfonated hydrocarbons and about 10 weight percent of water. Generally similar results to those obtained in Example II are obtained, the A. S. T. M. color being reduced from 8 to 5 and additional acidity being generated in the sulfonates.

The process of the invention is applicable generally to the treatment of petroleum sulfonate stocks including unneutralized sulfonic acids and the various well known salts of sulfonic acids with metals such as alkali metals, e. g. sodium, potassium, lithium, etc., alkaline earth metals, e. g. calcium, magnesium, barium, etc., or with nitrogen bases, e. g. ammonia and various organic nitrogen bases such as those disclosed in Patent No. 2,559,439 issued July 3, 1951 to Robert C. Jones et al.

It is believed that the process of the invention involves oxidation of carbon atoms in the sulfonate stock to produce carboxyl groups which increase the acidity of the stock and provide improved wetting properties. This result is obtained in the case of the unneutralized acids, where the temperature is low enough to prevent decomposition of the sulfonic acid group, and also in the case of the known neutralization products of petroleum sulfonic acids generally. In the latter case, the cation attached to the sulfonic acid group helps to protect that group from decomposition.

This application is a continuation-in-part of copending application Serial No. 376,953, filed August 27, 1953, and now abandoned.

The invention claimed is:

1. Method for improving the properties of petroleum sulfonate stock which comprises: contacting petroleum sulfonate stock with an ozone-containing gas; and continuing the contacting until carboxyl acidity equivalent to at least 0.05 cc. of 1 N NaOH per 100 ml. of a 0.5 weight percent solution of the sodium salts of the sulfonic acids has been produced.

2. Method according to claim 1 wherein the petroleum sulfonate stock contains less than 5 weight percent of hydrocarbon oil on the anhydrous basis.

3. Method according to claim 1 wherein the contacting is conducted at a temperature within the range from 100° F. to 200° F.

4. Method according to claim 1 wherein the ozone-containing gas is ozonized air.

5. Method according to claim 1 wherein the sulfonate stock comprises oil-insoluble petroleum sulfonate stock.

6. Method according to claim 5 wherein the sulfonate stock comprises an aqueous solution of alkali metal salts of oil-insoluble petroleum sulfonic acids.

7. Method for improving the properties of oil insoluble petroleum sulfonates which comprises: contacting an aqueous solution of alkali metal salts of oil-insoluble petroleum sulfonic acids with an ozone-containing gas at a temperature within the range from 100° F. to 200° F. and a pressure less than 100 p. s. i. g., 0.01 to 0.5 cubic feet of ozone-containing gas per minute being contacted with 1000 ml. of said solution; and continuing the contacting until carboxyl acidity equivalent to at least 0.5 cc. of 1 N NaOH per 100 ml. of a 0.5 weight percent solution of the sodium salt of said sulfonic acids has been produced in said salts.

8. Method according to claim 7 wherein said salts are substantially oil free, and wherein said carboxyl acidity is within the approximate range from 1.5 to 3.0.

9. Method according to claim 7 wherein said salts contain 5 to 25 weight percent of oil on the water-free basis, and wherein said acidity is within the approximate range from 0.5 to 1.0.

10. The product obtained according to the method of claim 1 and having carboxyl acidity equivalent to 0.05 to 3.0 cc. of 1 N NaOH per 100 ml. of a 0.5 weight percent solution of said product in the form of its sodium salt.

11. Method according to claim 1 wherein the sulfonate stock comprises oil-soluble petroleum sulfonate stock.

No references cited.